US00RE37538E

(19) United States
(12) Reissued Patent
Morrill

(10) Patent Number: US RE37,538 E
(45) Date of Reissued Patent: Feb. 5, 2002

(54) RAM TYPE BLOWOUT PREVENTER

(75) Inventor: Charles D. Morrill, Humble, TX (US)

(73) Assignee: Hydril Company, Houston, TX (US)

This patent issued on a continued prosecution application filed under 37 CFR 1.53(d), and is subject to the twenty year patent term provisions of 35 U.S.C. 154(a)(2).

(21) Appl. No.: 08/548,201

(22) Filed: Oct. 25, 1995

Related U.S. Patent Documents

Reissue of:
(64) Patent No.: 5,255,890
Issued: Oct. 26, 1993
Appl. No.: 08/017,314
Filed: Feb. 11, 1993

U.S. Applications:
(63) Continuation of application No. 07/975,271, filed on Nov. 12, 1992, now abandoned.

(51) Int. Cl.[7] ..... E21B 33/06
(52) U.S. Cl. ..... 251/1.3; 277/27
(58) Field of Search ..... 277/27, 142, 173, 277/174, 175; 220/240; 251/1.3

(56) References Cited

U.S. PATENT DOCUMENTS

| | | | |
|---|---|---|---|
| 3,156,475 | A | 11/1964 | Gerard et al. |
| 3,223,003 | A | 12/1965 | Gerard et al. |
| 3,508,849 | A | 4/1970 | Weber |
| 3,540,533 | A | 11/1970 | Morrill |
| 4,019,749 | A | 4/1977 | Dawson et al. |
| 4,264,054 | A | 4/1981 | Morrill |
| 4,377,273 | A | 3/1983 | Beson |
| 4,476,935 | A | 10/1984 | Hynes et al. |
| 4,566,372 | A | 1/1986 | Zandel et al. |
| 4,602,806 | A | 7/1986 | Saliger |
| 4,638,972 | A | 1/1987 | Jones et al. |
| 4,787,654 | A | 11/1988 | Zeitlin |
| 4,982,889 | A | 1/1991 | Eardley |
| 5,090,661 | A | 2/1992 | Parks, Jr. et al. |
| 5,165,704 | A | 11/1992 | Schaeper et al. |
| 5,255,890 | A | 10/1993 | Morrill |

OTHER PUBLICATIONS

1968—1969 Shaffer Valves Catalog, 3 pp.
1984—1985 General Catalog from NL Shaffer, 2 pp.
Drawing No. D–719319 from NL Shaffer, 1 pg.
*Hydril Operator's Manual*, pp. 1–1 (6553–7/80), 3–3 (6553–3/80), and 3–3 (6715–12/81), 18¾" Ram Blowout Preventers.
Cameron Iron Works, "Torque Requirements Slashed with New Cameron BOP Seal Carrier," p. 7 (with 'U' BOP–FIG. 1).
Cameron Iron Works, *Drilling Systems*: Ram–Type Blowout Preventers, 1988, pp. 642, 643, 646 and 647.
Cameron Iron Works, *Drilling Systems*: Ram–Type Blowout Preventers, 1988, UII BOB, pp. 650–653.
NL Shaffer, "Protected Hydraulic System . . . Simplified Ram Changing and Maintenance . . . Long–Wearing Seals".
Koomey Inc., *J–Line*, "Blowout Preventers," Model PB and Model L (two pages).

*Primary Examiner*—John Fox
(74) *Attorney, Agent, or Firm*—Rosenthal & Osha, L.L.P.

(57) ABSTRACT

There is disclosed a ram type blowout preventer wherein the outer ends of guideways radiating from the bore of the body to receive the rams are closed by bonnets bolted to the body and sealed with respect to the body by a seal assembly received in a recess in the inner face of the bonnet for sealing between the inner face of the bonnet and the outer face of the body about the outer end of the guideway to contain internal pressure in the preventer.

9 Claims, 2 Drawing Sheets

FIG. 4
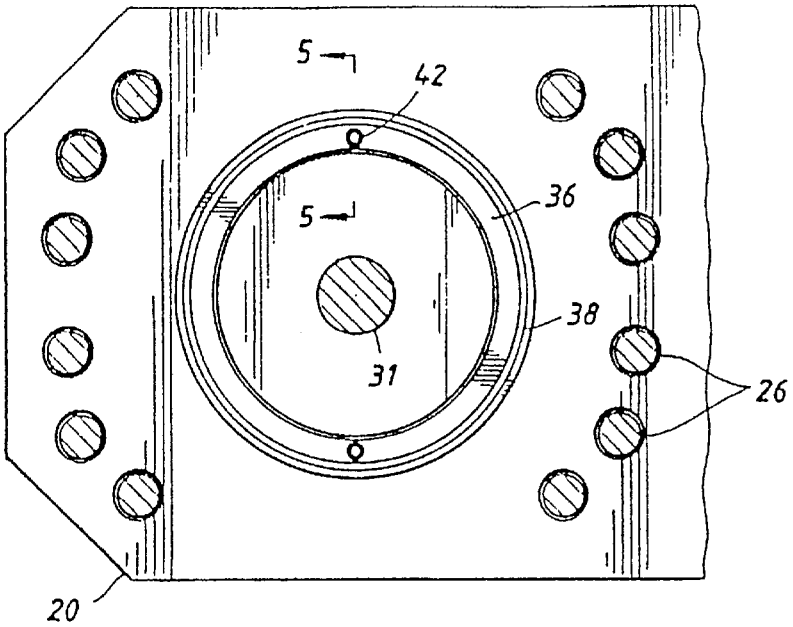
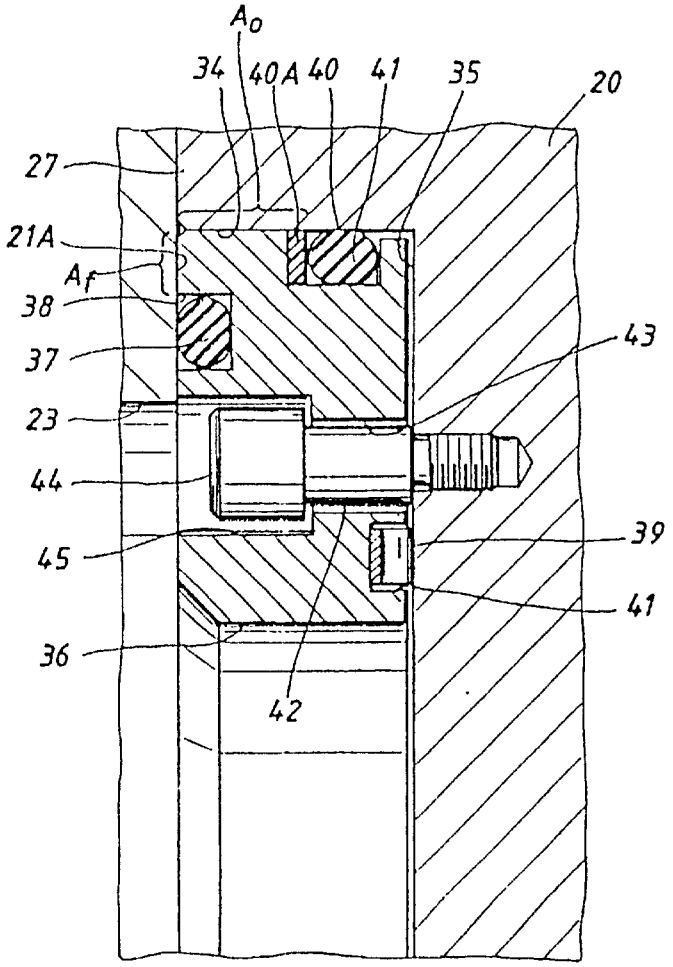
FIG. 5

RAM TYPE BLOWOUT PREVENTER

Matter enclosed in heavy brackets [ ] appears in the original patent but forms no part of this reissue specification; matter printed in italics indicates the additions made by reissue.

This application is a continuation of application Ser. No. 07/975,271, filed Nov. 12, 1992, now abandoned.

This invention relates generally to blowout preventers for closing about a pipe or other objects in the bore or across an open bore of a housing mounted on a wellhead. More particularly, it relates to improvements in ram type blowout preventers wherein rams are slidable within guideways extending radially from the bore between inner positions to engage one another to close the bore and outer positions to open the bore.

Conventionally, bonnets are mounted on the body for movement between positions opening and closing the outer ends of the guideways to permit the rams to be installed within or removed from the guideways. Hydraulic operators mounted on the bonnets include a rod extending through the bonnet for connection with the rams. The bonnets may be hinged to the body for swinging between opened and closed positions, or they may be so moved by the hydraulic operators. In either case, the inner faces of the bonnets are forced into tight engagement with the outer faces of the body by bolts connecting the bonnet to the body.

Packings are carried on the inner face of the bonnet to sealably engage the outer face of the body in an effort to contain the fluid pressure in the preventer bore, and thus in the guideways. As a practical matter, however, neither face is perfectly flat so that there are gaps between them even when forced against one another as the bolts are made up. Also, the fluid pressure in the preventer may be so high as to cause the bonnet to bend outwardly, thus tending to create even greater gaps between the faces into which the packing may extrude, in addition to those gaps which normally result from deflection of the bolts due to the internal pressure, whereby the large gaps which occur because of deflection are very difficult to seal under conditions of high/low temperatures and high pressure. As a result, it has been the practice to make up the bolts with greater and greater torque, all of which is time-consuming. Furthermore, many preventer bodies and bonnets are of such configuration that they cannot be connected by a full circle of bolts, thus leaving potential leak paths.

The object of this invention is to provide a ram type blowout preventer of the type described in which the body and bonnet faces are so sealed with respect to one another as to overcome these and other problems; and, more particularly, to provide such a preventer having means for sealing between the faces which is of such construction as to eliminate gaps between the faces of the bonnet and body through which leaks might occur without having to overtorque the bolts.

These and other objects are accomplished, in accordance with the illustrated and preferred embodiment of the invention, by a ram type blowout preventor of the type described in which the bonnet has a recess in its inner face to form a peripheral wall and an end wall opposite the outer face of the body when the bonnet is closed, and a metal ring mounted on the bonnet for limited axial and radial movement within the recess carriers a first elastomeric ring on its inner side for sealing against the face of the body. Means such as a spring acts between the inner wall of the recess and the metal ring to yieldably urge the inner side of the metal ring toward said outer face of the bonnet, and a second elastomeric ring is carried about the outer periphery of the metal ring for sealing against the peripheral wall of the recess about an area which is greater than the area of the sealing engagement of the first elastomeric ring with the bonnet face and spaced outwardly therefrom, whereby fluid pressure in the guideway is effective to urge the metal ring toward the outer bonnet face and at the same time expand its outer circumference toward said peripheral wall of the recess. More particularly, the metal ring is of such construction that its inner side is tightly engaged against the outer face of the body prior to radial expansion of the ring periphery thereof and tightly against the peripheral wall of the recess, thus assuring that gaps between the body and bonnet surfaces are closed to prevent extrusion of the elastomeric rings between them.

In the illustrated embodiment of the invention, the metal ring has holes extending therethrough from its inner to its outer sides, and bolts extend loosely through the holes and into the end wall of the recess and have enlarged outer ends to retain the metal ring on the bonnet while permitting it to move limited distances radially as well as axially of the bolts.

In the drawings, wherein like reference characters are used throughout to designate like parts:

FIG. 4 is a somewhat enlarged cross-sectional view of the preventer, as seen along broken lines 4—4 of FIG. 1; and FIG. 5 is an enlarged cross-sectional view of a part of the preventer indicated by the circle "5" of FIG. 1, and showing the details of the assembly which seals between the body and bonnet faces.

Figure 1:
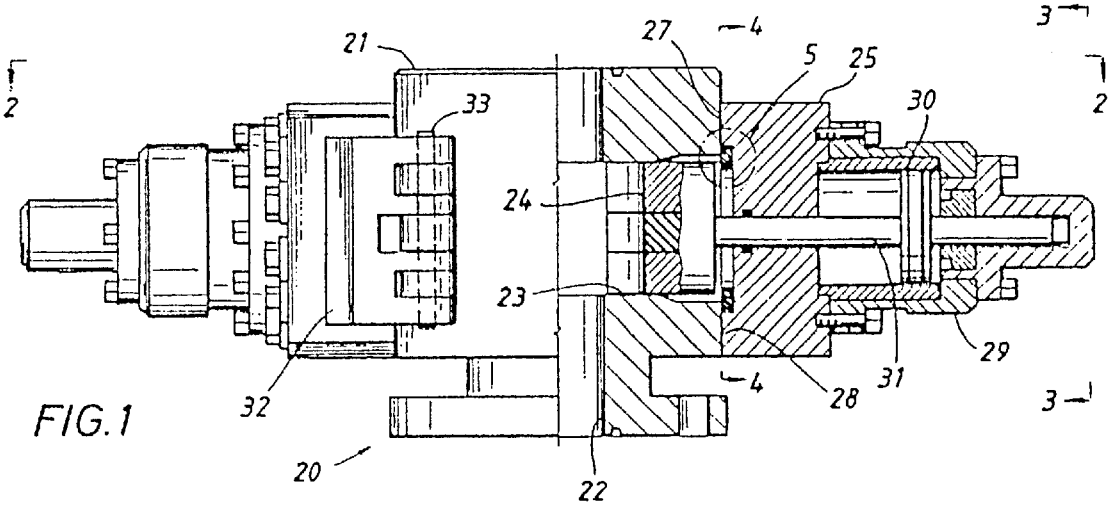
FIG. 1 is a side view of a blowout preventer constructed in accordance with the preferred embodiment of the invention and with its left end in elevation and right end in vertical section, and showing the bonnets closed and at least the right-hand ram withdrawn to its open position.

With reference now to the details of the above described drawings, the overall preventer, which is indicated in its entirety by reference character 20, comprises a body 21 having a bore 22 therethrough and means such as a flange on its lower end, so that as well-known in the art, it may be installed on the upper end of a wellhead to form an upper continuation of the bore through the wellhead and thus to receive pipe, such as drill pipe, as it is being lowered into or raised from within the wellhead and thus the well therebelow.

Figure 2:
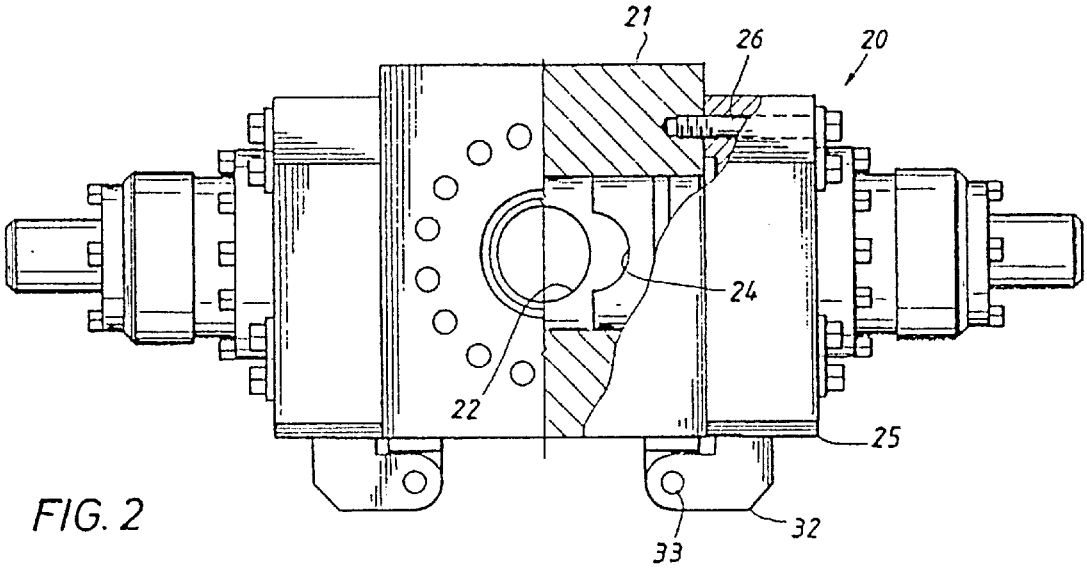
FIG. 2 is a top view of the preventer, as seen along broken lines 2—2 of FIG. 1, and with its left end in plan and its right end partly broken away.

As previously described, the body also has guideways 23 extending from its bore and through the body generally radially opposite one another (only the right-hand guideway being shown in FIGS. 1 and 2), and a ram 24 is slidable within each guideway for movement between an inner position in which its inner end engages the inner end of another ram, and an outer position, as shown in FIGS. 1 and 2, wherein it opens the bore. As shown, the rams have recesses on their inner ends for fitting closely about a pipe within the bore, and carry seal members across its front face and along the opposite sides and over the top of the ram for sealing with respect to a pipe in the bore and an opposed ram as well as with respect to the guideway in the preventer body when the rams are closed.

The outer end of each guideway is adapted to be opened and closed by means of a bonnet 25 releasably connected to the body by means of threaded bolts 26. As will be described in detail to follow, when the bonnet is so connected, its inner face 27 is sealed with respect to an outer face 28 on the body which surrounds the outer end of the guideway 23 so as to contain fluid pressure within the preventer.

The rams are adapted to be moved between open and closed positions by operating means including a cylinder 29 mounted on the outer side of the bonnet 25, and a piston 30 sealably reciprocal in the cylinder and having a rod 31 which extends through a hole in the bonnet to connect with the arm 24. Thus, in a manner well-known in the art, hydraulic fluid may be selectively introduced to and exhausted from opposite sides of the piston 30 in the cylinder 29 for selectively moving the ram between its open and closed positions.

A hinge 32 connects the bonnet to the body for swinging about hinge pin 33 between open and closed positions when it has been disconnected from the body by backing off the bolts 26. The outer end of the guideway would be suitably enlarged to permit the ram to move freely into and out of the guideway when the ram is in its outer open position.

Figure 3:
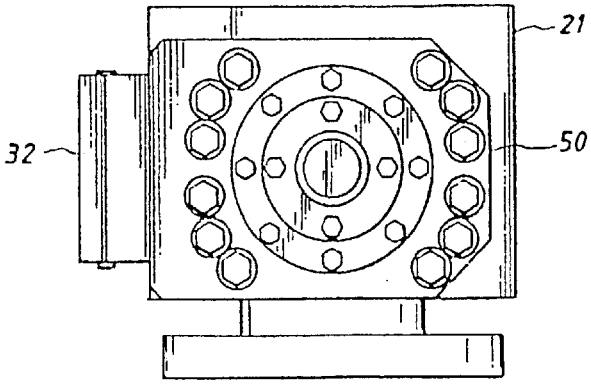
FIG. 3 is a view of the end of the preventer, as seen along broken lines 3—3 of FIG. 1.

As shown in FIGS. 3 and 4, the preventer body is of generally square construction, while the bonnet 25 is more rectangular due primarily to its lesser height. Thus, as shown in these figures, there is no room for bolts 26 along the top and bottom of the bonnet.

As previously described, and in accordance with the novel aspects of the present invention, the inner face 27 of each bonnet has an annular recess formed therein which, as shown, is cylindrical, but which may be of other configuration, such as oval. The recess has a peripheral wall 34 and an end wall 35 which is opposite the outer face 21A of the preventer body, and a seal assembly, including a metal ring 36, is mounted in the recess for limited axial and radial movement within the recess. More particularly, the assembly also includes a first elastomeric ring 37 which is received in a groove about the inner side of the metal ring for engaging the outer face 21A of the body. As shown, the seal ring is an O-ring having a diameter greater than the depth of the recess so as to protrude therefrom, and a wavy spring 39 is received within a groove 41 about the outer side of the metal ring in position to be axially compressed between the bottom of the groove and the end wall 35 of the bonnet recess, whereby the metal ring is urged inwardly toward the body face 21A so as to compress the seal ring 37 between the face and bottom of the groove in the metal ring.

As previously described, the assembly also includes another elastomeric seal ring 40 which is received in a groove 41 about the outer circumference of the metal ring opposite the peripheral wall 34 of the recess. As shown, this ring 40 is also an O-ring and has a diameter greater than the depth of the groove 41 so as to protrude therefrom and thus sealably engage the wall 34. There is also a back-up ring 40A in the groove 41 on the inner side of seal ring 40.

Of course, the seal rings 37 and 40 may be other than O-rings, such as lips arranged to face the internal pressure. Also, means other than the wavy spring 39, such as an O-ring may be compressed axially between the groove and end wall of the recess, may be used to initially urge the inner side of the metal ring against the outer face 21A.

As also previously described, and as best shown in FIG. 5, the O-ring 40 sealably engages the peripheral wall of the recess about an area greater than the area with which the seal ring 37 sealably engages the face 21A of the preventer body. Hence, fluid pressure in the guideway of the preventer is effective to urge the metal ring inwardly against the face 21A with a force equal to that pressure times an annular area equal to the difference between the outer diameter of the O-ring 40 and the sealing diameter of the seal ring 38.

At the same time, since the O-ring 40 sealably engages the cylindrical wall 34 outwardly from the preventer body face 21A which is sealably engaged by the O-ring 37, the metal ring is urged radially outwardly toward the wall 34 by a force equal to the internal pressure times an annular area intermediate the sealing engagement of the O-ring 37 with the face 21A and the sealing engagement of the O-ring 40 with the wall 34. More particularly, as as previously described, the ring is of such size and shape that the internal pressure will force the inner side of the metal ring tightly against the outer face of the body prior to radial expansion of its periphery against the peripheral wall of the recess.

The selection of the shape of the ring as well as the above described annular sealing areas for accomplishing this object would be obvious to a person skilled in the art in view of the novel concept of the present invention. Thus, for example, the metal ring should not be so thin relative to its length as to be too stiff in an axial direction to conform to the outer face of the preventer body, or to lack sufficient stiffness radially to cause its outer periphery to engage the peripheral wall of the recess too soon and thus lock it within the recess prior to axial movement of its inner side against the face 21A of the body. In this manner, the metal ring should not be so thick in a radial direction as to prevent its outer periphery from conforming to the peripheral wall, following conforming of its inner side against the outer face of the body, so as to close gaps through which seal ring 40 might extrude. A further consideration, of course, is the location of the seal ring 40 so as to provide an annular area over which internal pressure acts to provide the force necessary to fully expand the metal ring.

As shown on the drawings, the areas $A_f$ and $A_o$ are respectively the unbalanced area of the seal face of the ring and the unbalanced area about the outer periphery of the ring. The minimum area $A_o$ for a given $A_f$, in order to accomplish the purposes of the present invention, may be calculated in accordance with the following equations, wherein:

P=Internal Blowout Preventer Pressure $P_e$=Pressure to overcome ring stiffness $P_f$=Pressure to overcome frictional resistance between inner end of ring and outer face of preventer body $P_c$=Internal Blowout Pressure at which ring is expanded to close the gap (The gap is usually 0.005" or more with the ring at rest.)

$F_o$=Reaction force on the face $A_o$ $F_f$=Reaction force on the face $A_f$ $\mu$=Assumed coefficient of friction.

N=Safety factor

Expansion of the ring into contact with the peripheral wall of the cavity 34 is resisted by the stiffness of the ring plus the frictional sliding force of the ring against the outer face 21A of the body. The pressure $P_c$ for so expanding the ring is the sum of pressures $P_e$ and $P_f$, and the pressure $P_f$ for overcoming frictional resistance equals $\mu\ F_f/A_f$.

$$F_f=P_c(A_f)$$

so that, by substituting:

$$P_f=\mu(P_c).$$

$$P_c=P_e+\mu(P_c)$$

Consequently:

$$P_c=P_e/(1-\mu).$$

In the case of a circular ring, $P_e$ is found by solving the equation for expansion of an open end, thick-walled cylinder (see Roark, Formulas for Stress and Strain). As is well-known in the art, the equation for a noncircular ring will involve additional factors.

Thus, the force required to expand the ring into contact with the peripheral surface of the cavity equals $P_c(A_o)$, and the sum of forces $F_o$ in the radial direction is $P(A_o)-P_c(A_o)$, wherein, as above noted, $F_o$ is the reaction to the pressure-induced force of the ring on the peripheral wall upon contact.

Using the safety factor N, the desired relationship of the forces on the axial direction is $$P(A_f)=N(\mu)(F_o)$$

Substituting for $F_o$:

$$P(A_o)=P(A_f)/N(\mu)+P_c(A_o).$$

Solving for the desired area ratio:

$$A_f/A_o=N(\mu)(1-P_c/P)$$

The area ratio calculated from this equation is a minimum value. Once $A_f$ has been determined, this equation allows the calculation of the maximum value for $A_o$ for dependable functioning of the bonnet seal ring. These equations hold for both circular and non-circular seal rings.

The metal ring 36 is mounted on the bonnet by a pair of spaced-apart bolts 42 which extend through holes 43 in the ring and which are threadedly connected at their inner ends to threaded sockets in the end wall of the recess. As shown, the holes 43 are substantially larger than the diameter of the bolts 42 so as to permit limited radial movement of the metal ring with respect to the bolts, as may be necessary to enable the metal ring to be forced radially outwardly by internal pressure, as previously described.

The metal ring is retained on the bonnet by an enlarged head 44 received in a recess 45 on the inner side of the metal ring. Thus, as shown, the heads 44 are larger than the holes 43. On the other hand, there is sufficient space between the enlarged heads 44 and the inner ends of the recesses 45 to permit sufficient axial movement of the metal ring with respect to the bolt in order to accomplish the purposes of this invention.

From the foregoing it will be seen that this invention is one well adapted to attain all of the ends and objects hereinabove set forth, together with other advantages which are obvious and which are inherent to the apparatus.

It will be understood that certain features and subcombinations are of utility and may be employed without

What is claimed is:

1. A ram type blowout preventer, comprising:

a body having a bore therethrough and guideways extending radially outwardly from the bore, rams each slidable within a guideway between inner positions engaging one another to close the bore and outer positions to open the bore, bonnets mounted on the body each for movement between positions opening and closing the outer end of a guideway, operating means including a rod extending through the bonnet for connection to each ram in order to move the ram between opened and closed positions, bolts connecting the bonnets to the body for forcing an inner face of each bonnet against an outer face of the body about the end of the guideway, and means for sealing between the faces of the body and each bonnet in the closed position of the bonnet, including a peripheral wall on one end an end wall on the other of the bonnet and body faces, a metal ring between the bonnet and body for limited axial and radial movement with respect thereto, a first seal ring mounted on a side of the metal ring for sealing against the end wall, means yieldably urging the side of the metal ring toward said end wall, and a second seal ring mounted about the outer periphery of the metal ring for engaging the peripheral wall about an area which is greater than the area of engagement of the first seal ring with the end wall and spaced axially therefrom, the axial length and radical thickness of the metal ring being so related that fluid pressure in the guideway will force its side tightly against the end wall prior to radial expansion of its periphery tightly against the peripheral wall.

2. A preventer of the character defined in claim 1, wherein the peripheral wall is on the bonnet and the end wall is on the body, and the urging means acts between the bonnet and the opposite side of the metal ring.

3. A preventer of the character defined in claim 2, wherein the metal ring is received in a recess having an end wall in the inner face of the bonnet opposite the end wall of the outer face of the body.

4. [A preventer of the character defined in claim 3, wherein]*A ram type blowout preventer, comprising:*

*a body having a bore therethrough and guideways extending radially outwardly from the bore,*

*rams each slidable within a guideway between inner positions engaging one another to close the bore and outer positions to open the bore,*

*bonnets mounted on the body each for movement between positions opening and closing the outer end of the guideway,*

*operating means including a rod extending through the bonnet for connection to each ram in order to move the ram between opened and closed positions,*

*bolts connecting the bonnets to the body for forcing an inner face of each bonnet against an outer face of the body about the outer end of the guideway, and*

*means for sealing between the faces of the body and each bonnet on the closed position of the bonnet, including*

*a peripheral wall on the bonnet and an end wall on the body,*

*a metal ring between the bonnet and the body for limited axial and radial movement with respect thereto, wherein*

*the metal ring is received in a recess having an end wall in the inner face of the bonnet opposite the end wall of the outer face of the body,* the metal ring [has] *having* holes extending therethrough from its inner to its outer sides, and bolts extend loosely through the holes and into the end wall of the recess and have enlarged [outer] ends to retain the metal ring on the bonnet while permitting it to move limited distances radially as well as axially of the bolts[.],

*a first seal ring mounted on a side of the metal ring for sealing against the end wall,*

*a second seal ring mounted about the outer periphery of the metal ring for engaging the peripheral wall about an area which is greater than the area of the engagement of the first seal ring with the end wall and spaced axially therefrom,*

*the axial length and radial thickness of the metal ring being so related that fluid pressure in the guideway will force its side tightly against the end wall prior to radial expansion of its periphery tightly against the peripheral wall.*

*5. The blowout preventer as defined in claim 4 further comprising a spring for urging said metal ring into contact with said end wall.*

*6. A ram type blowout preventer, comprising:*

*a body having an upper end, a lower end, and a bore therethrough and guideways extending radially outwardly from said bore;*

*rams each slidable within one of said guideways between an inner position to close said bore and an outer position to open said bore;*

*bonnets each mounted on said body proximally to one of said guideways;*

*an operating mechanism in each said bonnet, said mechanism including a rod extending through said bonnet and coupled to one of said rams to move said ram between said open and said closed positions, wherein a peripheral area of each bonnet about the operating mechanism comprises a first region between the operating mechanism and the upper end of the body, a second region between the operating mechanism and the lower end of the body, and two side regions;*

*bolts for attaching each of said bonnets to said body, said bolts for forcing an inner face of each said bonnet into contact with an outer face of said body about an outer end of each said guideway wherein said bolts are disposed only in said two side regions;*

*a seal positioned between each said outer face of said body and each said inner face of each said bonnet, each said seal comprising a peripheral wall on said bonnet, and an end wall on said body, a metal ring positioned between said bonnet and said body for limited axial and radial movement relative thereto, said metal ring disposed in a recess having an end wall in the inner face of said bonnet opposite the end wall of the outer face of said body wherein said metal ring has holes extending therethrough from its inner to its outer sides, and bolts each extending loosely through one of said holes and into the end wall of said recess, said bolts having enlarged outer ends to retain said metal ring on said bonnet while enabling limited movement radially and axially with respect to said bolts, a first seal ring mounted on a side of said metal ring for sealing against said end wall, a second seal ring mounted about the outer periphery of said metal ring for engaging said peripheral wall about an area which is greater than an area of engagement of said first seal ring with said end wall and spaced axially therefrom, an axial length and a radial thickness of said metal ring being so related that fluid pressure in said guideways forces a side of said metal ring tightly against said end wall before said metal ring radially expands tightly against said peripheral wall.*

*7. A ram type blowout preventer, comprising:*

*a body having an upper end, a lower end, and a bore therethrough and guideways extending radially outwardly from said bore;*

*rams each slideable within one of said guideways between an inner position to close said bore and an outer position to open said bore;*

*bonnets each mounted on said body proximally to one of said guideways;*

*an operating mechanism in each said bonnet, said mechanism including a rod extending through said bonnet and coupled to one of said rams to move said ram between said open and said closed positions, wherein a peripheral area of each bonnet about the operating mechanism comprises a first region between the operating mechanism and the upper end of the body, a second region between the operating mechanism and the lower end of the body, and two side regions;*

*bolts for attaching each of said bonnets to said body, said bolts for forcing an inner face of each said bonnet into contact with an outer face of said body about an outer end of each said guideway, wherein said bolts are disposed only in said two side regions; and*

*a seal positioned between each said outer face of said body and each said inner face of each said bonnet, each said seal comprising a peripheral wall on one of said inner and outer faces, and an end wall on the other one of said inner and outer faces, a metal ring positioned between said bonnet and said body for limited axial and radial movement relative thereto, a spring for urging said metal ring into contact with said end wall, a first seal ring mounted on a side of said metal ring for sealing against said end wall, a second seal ring mounted about the outer periphery of said metal ring for engaging said peripheral wall about an area which is greater than an area of engagement of said first seal ring with said end wall and spaced axially therefrom, an axial length and a radial thickness of said metal ring being so related that fluid pressure in said guideways fores a side of said metal ring tightly against said end wall before said metal ring radially expands tightly against said peripheral wall.*

*8. A ram type blowout preventer, comprising:*

*a body having an upper end, a lower end, and a bore therethrough and guideways extending radially outwardly from said bore;*

*rams each slideable within one of said guideways between an inner position to close said bore and an outer position to open said bore;*

*bonnets each mounted on said body proximally to one of said guideways;*

*an operating mechanism in each said bonnet, said mechanism including a rod extending through said bonnet and coupled to one of said rams to move said ram between said open and said closed positions, wherein a peripheral area of each bonnet about the operating mechanism comprises a first region between the operating mechanism and the upper end of the body, a second region between the operating mechanism and the lower end of the body, and two side regions;*

*a coupling for attaching each of said bonnets to said body by forcing an inner face of each said bonnet into contact with an outer face of said body about an outer end of each said guideway, each said coupling providing force in said two side regions, wherein said coupling comprises bolts or hinges disposed only in said two side regions;*

*a seal positioned between each said outer face of said body and each said inner face of each said bonnet, each said seal comprising a peripheral wall on the bonnet, and an end wall on the body, a metal ring positioned between said bonnet and said body for limited axial and radial movement relative thereto, said metal ring disposed in a recess having an end wall in the inner face of said bonnet opposite the end wall of the outer*

*face of said body wherein said metal ring has holes extending therethrough from its inner to its outer sides, and bolts each extending loosely through one of said holes and into the end wall of said recess, said bolts having enlarged outer ends to retain said metal ring on said bonnet while enabling limited movement radially and axially with respect to said bolts, a first seal ring mounted on a side of said metal ring for sealing against said end wall, a second seal ring mounted about the outer periphery of said metal ring for engaging said peripheral wall about an area which is greater than an area of engagement of said first seal ring with said end wall and spaced axially therefrom, an axial length and a radial thickness of said metal ring being so related that fluid pressure in said guideways forces a side of said metal ring tightly against said end wall before said metal ring radially expands tightly against said peripheral wall.*

*9. A ram type blowout preventer, comprising:*

*a body having an upper end, a lower end, and a bore therethrough and guideways extending radially outwardly from said bore;*

*rams each slidable within one of said guideways between an inner position to close said bore and an outer position to open said bore;*

*bonnets each mounted on said body proximally to one of said guideways;*

*an operating mechanism in each said bonnet, said mechanism including a rod extending through said bonnet and coupled to one of said rams to move said ram between said open and said closed positions, wherein a peripheral area of each bonnet about the operating mechanism comprises a first region between the operating mechanism and the upper end of the body, a second region between the operating mechanism and the lower end of the body, and two side regions;*

*a coupling for attaching each of said bonnets to said body by forcing an inner face of each said bonnet into contact with an outer face of said body about an outer end of each said guideway, each said coupling providing force in only said two side regions;*

*a seal positioned between each said outer face of said body and each said inner face of each said bonnet, each said seal comprising a peripheral wall on one of said inner and outer faces, and an end wall on the other one of said inner and outer faces, a metal ring positioned between said bonnet and said body for limited axial and radial movement relative thereto, a spring for urging said metal ring into contact with said end wall, a first seal ring mounted on a side of said metal ring for sealing against said end wall, a second seal ring mounted about the outer periphery of said metal ring for engaging said peripheral wall about an area which is greater than an area of engagement of said first seal ring with said end wall and spaced axially therefrom, an axial length and a radial thickness of said metal ring being so related that fluid pressure in said guideways forces a side of said metal ring tightly against said end wall before said metal ring radially expands tightly against said peripheral wall.*

* * * * *